A. NEWELL.
Improvement in Pulley and Wheel Fastener.

No 123,413. Patented Feb. 6, 1872.

123,413

UNITED STATES PATENT OFFICE.

AUGUSTUS NEWELL, OF CHICAGO, ILLINOIS.

IMPROVEMENT IN PULLEY AND WHEEL FASTENERS.

Specification forming part of Letters Patent No. 123,413, dated February 6, 1872.

Specification describing a certain Improved Pulley and Wheel Fastener, invented by AUGUSTUS NEWELL, of Chicago, in the county of Cook and State of Illinois.

Figure 1:
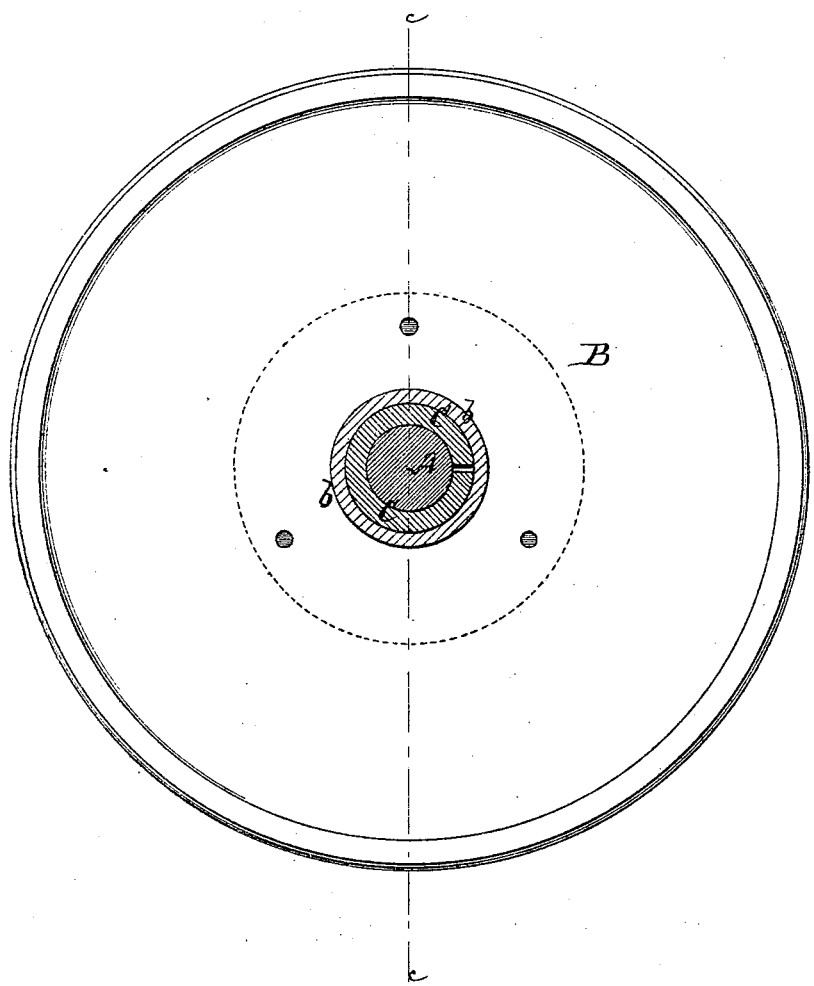
Figure 2:
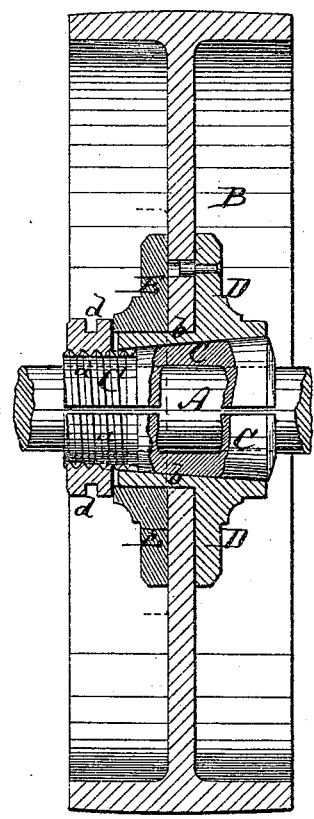

Figure 1 represents a face view of a pulley, showing the fastener partly in section. Fig. 2 is a vertical transverse section of the same on the line $c\ c$, Fig. 1.

Similar letters of reference indicate corresponding parts.

This invention has for its object to furnish a simple and reliable means of fastening pulleys and wheels of suitable kind to shafts or axles; and consists in the use, for that purpose, of a split, conical, tubular screw, which, by means of a nut, is clamped to the shaft, and crowded against the inner edge of the wheel or pulley. By the use of my improved holder I am enabled to secure pulleys entirely concentric, which heretofore was exceedingly difficult, and considered almost impossible. I am, by the use of my invention, also enabled to secure wooden pulleys upon shafts, as well as such made of metal.

A in the drawing represents a shaft, upon which the pulley B is to be mounted. C is the holder. It is made of truncated conical form, with a cylindrical internal bore, and is split or cut open from end to end, as shown. At its small end it has a screw-thread, $a$. The holder is slipped on the axle and enters the wheel or pulley with its small end. Where a wooden pulley or one having no hub is to be applied, it will be necessary to provide an artificial hub. This is done by means of a pair of annular plates, D and E, placed against the opposite faces of the hub, the one plate, D, having an internal flange, $b$, with conical inner bore, to correspond to the shape of the holder C. When the holder is introduced within the hub $b$ of the plate D, its larger end will still project beyond such hub, being still larger in diameter than the same. A nut, $d$, then screwed upon the threaded small end of the holder, draws the same as far into the hub as possible, besides contracting the holder against the axles, thus securing it firmly to the axle as well as to the hub, and fastening the latter to the axle. The nut at one side bears against the plate E, and the large end of the holder against the plate D, and thus the two plates are also crowded against the pulley. Where the pulley or wheel has a hub formed on it, the plates D E are dispensed with; but the hub is bored slightly tapering to fit the holder.

Having thus described my invention, I claim as new and desire to secure by Letters Patent—

The split conical holder C, combined, as described, with an ordinary hub, (or one formed of plates D E,) and nut $d$, as and for the purpose described.

AUGUSTUS NEWELL.

Witnesses:
   B. L. PEASE,
   W. W. PERKINS.